(12) United States Patent
Nerurkar et al.

(10) Patent No.: US 10,430,605 B1
(45) Date of Patent: Oct. 1, 2019

(54) DIFFERENTIALLY PRIVATE DATABASE PERMISSIONS SYSTEM

(71) Applicant: LeapYear Technologies, Inc., Berkeley, CA (US)

(72) Inventors: Ishaan Nerurkar, Berkeley, CA (US); Christopher Hockenbrocht, Berkeley, CA (US); David Spies, Berkeley, CA (US)

(73) Assignee: LeapYear Technologies, Inc., Berkeley, CA (US)

( * ) Notice: Subject to any disclaimer, the term of this patent is extended or adjusted under 35 U.S.C. 154(b) by 0 days.

(21) Appl. No.: 16/205,034

(22) Filed: Nov. 29, 2018

(51) Int. Cl.
G06F 21/00 (2013.01)
G06F 21/62 (2013.01)
G06F 16/245 (2019.01)

(52) U.S. Cl.
CPC ........ G06F 21/6227 (2013.01); G06F 16/245 (2019.01)

(58) Field of Classification Search
CPC ............................ G06F 21/6227; G06F 16/245
See application file for complete search history.

(56) References Cited

U.S. PATENT DOCUMENTS

| | | | |
|---|---|---|---|
| 6,038,563 A * | 3/2000 | Bapat | G06F 1/00 |
| 6,438,549 B1 * | 8/2002 | Aldred | G06F 16/284 |
| | | | 707/640 |
| 6,546,389 B1 | 4/2003 | Agrawal et al. | |
| 6,823,338 B1 * | 11/2004 | Byrne | G06F 21/6227 |
| 7,356,840 B1 * | 4/2008 | Bedell | G06F 21/6227 |
| | | | 726/13 |
| 7,698,250 B2 | 4/2010 | Dwork et al. | |
| 7,801,967 B1 * | 9/2010 | Bedell | G06F 21/6218 |
| | | | 709/217 |

(Continued)

FOREIGN PATENT DOCUMENTS

WO WO 2015/090445 A1 6/2015
WO WO 2015/157020 A1 10/2015

OTHER PUBLICATIONS

"Recursion", definition from Merriam-Webster, https://www.merriam-webster.com/dictionary/recursion, retrieved Feb. 12, 2019.*

(Continued)

Primary Examiner — John B King
(74) Attorney, Agent, or Firm — Fenwick & West LLP

(57) ABSTRACT

A differentially private system receives a request from a client to perform a query on data stored in a database. The differentially private system establishes a set of permissions of the client with respect to the data in the database. The differentially private system deconstructs the query into query components. The query components include at least one relation that identifies a dataset in the database and at least one expressions specifying an operation to be performed in the identified dataset. The differentially private system identifies permissions necessary to perform the specified operation on the identified dataset. The differentially private system determines whether the established permissions grants of the client include the identified permissions necessary to perform the specified operation on the identified dataset. The differentially private system selectively executes the query responsive to the determination.

18 Claims, 8 Drawing Sheets

(56) References Cited

U.S. PATENT DOCUMENTS

| | | | | |
|---|---|---|---|---|
| 9,002,803 | B2* | 4/2015 | Qayyum | G06F 21/6227 707/687 |
| 9,384,226 | B1* | 7/2016 | Goel | G06F 16/9535 |
| 10,192,069 | B2* | 1/2019 | Nerurkar | G06N 5/003 |
| 2001/0034847 | A1* | 10/2001 | Gaul, Jr. | H04L 63/1433 726/25 |
| 2003/0110467 | A1* | 6/2003 | Balakrishnan | G06F 8/35 717/104 |
| 2003/0177118 | A1* | 9/2003 | Moon | G06F 16/353 |
| 2004/0225896 | A1* | 11/2004 | Ng | G06F 21/10 726/6 |
| 2004/0250120 | A1* | 12/2004 | Ng | G06F 21/6227 726/17 |
| 2006/0161527 | A1 | 7/2006 | Dwork et al. | |
| 2006/0200431 | A1* | 9/2006 | Dwork | G06F 21/6227 706/12 |
| 2006/0224597 | A1* | 10/2006 | Fitzpatrick | G06F 21/6245 |
| 2006/0265396 | A1* | 11/2006 | Raman | G06F 16/954 |
| 2006/0282433 | A1* | 12/2006 | Dutta | G06F 21/6218 |
| 2007/0047558 | A1* | 3/2007 | Ayers | H04L 29/12113 370/400 |
| 2007/0143289 | A1 | 6/2007 | Dwork et al. | |
| 2008/0033960 | A1* | 2/2008 | Banks | G06F 21/6227 |
| 2008/0133935 | A1* | 6/2008 | Elovici | G06F 21/6227 713/193 |
| 2009/0119298 | A1* | 5/2009 | Faitelson | G06F 21/604 |
| 2009/0177685 | A1* | 7/2009 | Ellis | G06Q 20/085 |
| 2009/0249436 | A1* | 10/2009 | Coles | G06F 21/6227 726/1 |
| 2009/0265354 | A1* | 10/2009 | Machak | G06F 17/243 |
| 2009/0327228 | A1 | 12/2009 | Krause et al. | |
| 2011/0064221 | A1 | 3/2011 | McSherry et al. | |
| 2011/0131222 | A1 | 6/2011 | DiCrescenzo | |
| 2011/0208763 | A1 | 8/2011 | McSherry et al. | |
| 2011/0282865 | A1* | 11/2011 | Talwar | G06F 16/245 707/722 |
| 2012/0143922 | A1* | 6/2012 | Rane | G06F 21/6245 707/803 |
| 2012/0166483 | A1* | 6/2012 | Choudhary | G06F 16/2471 707/770 |
| 2012/0197864 | A1* | 8/2012 | Bourdoncle | G06F 16/2428 707/711 |
| 2013/0031136 | A1* | 1/2013 | Shah | G06F 21/6218 707/783 |
| 2013/0332891 | A1* | 12/2013 | Schmitlin | G06F 3/0484 715/853 |
| 2014/0013400 | A1* | 1/2014 | Warshavsky | H04L 63/102 726/4 |
| 2014/0281572 | A1 | 9/2014 | Wang et al. | |
| 2014/0282910 | A1* | 9/2014 | Palmer | H04L 63/10 726/4 |
| 2014/0283091 | A1* | 9/2014 | Zhang | G06F 21/60 726/26 |
| 2015/0235051 | A1 | 8/2015 | Fawaz et al. | |
| 2015/0286827 | A1* | 10/2015 | Fawaz | H04L 9/00 726/26 |
| 2015/0293923 | A1 | 10/2015 | Eide et al. | |
| 2016/0105409 | A1* | 4/2016 | Torman | H04L 63/105 726/6 |
| 2016/0283738 | A1 | 9/2016 | Wang et al. | |
| 2016/0306709 | A1* | 10/2016 | Shaull | G06F 11/1458 |
| 2016/0335455 | A1 | 11/2016 | Mohan et al. | |
| 2017/0169253 | A1* | 6/2017 | Curcio | G06F 21/6263 |
| 2018/0039674 | A1* | 2/2018 | Seyvet | G06F 16/24568 |
| 2018/0239924 | A1* | 8/2018 | Rickard, Jr. | G06F 21/604 |

OTHER PUBLICATIONS

Agrawal, R. et al., "Privacy-Preserving Data Mining," ACM SIGMOD, May 2000, pp. 439-450.

Bost R. et al. "Machine Learning Classification over Encrypted Data". NDSS '15, Feb. 8-11, 2015, pp. 1-14.

Dwork, C. et al., "Differential Privacy and Robust Statistics," Proceedings of the Forty-First Annual ACM Symposium on Theory of Computing, Nov. 14, 2008, 42 pages, [Online] [Retrieved on Sep. 15, 2016], Retrieved from the Internet<URL:http://www.stat.cmu.edu/~jingle/dprs_stoc09.pdf>.

Dwork, C. "Differential Privacy: A Survey of Results," TAMC 2008, LNCS 4978, Agrawal, M. et al. (eds.), pp. 1-19.

Dwork, C., "A Firm Foundation for Private Data Analysis," Proceedings of the ACM, Jan. 2011, 8 pages, vol. 54, Issue 1.

Dwork, C. et al., "Calibrating Noise to Sensitivity in Private Data Analysis," Proceedings of the Third Conference on Theory of Cryptography, New York, NY, Mar. 4-7, 2006, pp. 265-284.

Friedman, A. et al., "Data Mining with Differential Privacy," Proceedings of the 16th ACM SIGKDD International Conference on Knowledge Discovery and Data Mining, Dec. 2010, 11 pages, [Online] [Retrieved on Sep. 13, 2016], Retrieved from the Internet<URL: http://users.cis.flu.edu/~lzhen001/activities/KDD_USB_key_2010/docs/p493.pdf>.

Huang, Y. et al., "Telco Churn Prediction with Big Data," Proceedings of the 2015 ACM SIGMOD International Conference on Management of Data, Jun. 4, 2015, 13 pages, [Online] [Retrieved on Sep. 13, 2016], Retrieved from the Internet<URL:http://users.wpi.edu/~yli15/Includes/SIGMOD15Telco.pdf>.

Jagannathan, G. et al., "A Practical Differentially Private Random Decision Tree Classifier," International Conference on Data Mining Workshops, Proceedings of the ICDM International Workshop on the Privacy Aspects of Data Mining, 2009, pp. 114-121.

Ji, Z. et al., "Differential Privacy and Machine Learning: a Survey and Review," Cornell University Library—arXiv preprint, Dec. 24, 2014, 32 pages, [Online] [Retrieved on Sep. 14, 2016], Retrieved from the Internet<URL:http://arxiv.org/pdf/1412.7584.pdf>.

Nissim, K. et al., "Smooth Sensitivity and Sampling in Private Data Analysis," Proceedings of the Thirty-Ninth Annual ACM Symposium on Theory of Computing, Jun. 13, 2007, 11 pages, [Online] [Retrieved on Sep. 14, 2016], Retrieved from the Internet<URL:http://www.cse.psu.edu/~sxr48/pubs/smooth-sensitiviy-stoc.pdf>.

Patil, A. et al., "Differential Private Random Forest," International Conference on Advances in Computing, Communications and Informatics, Sep. 27, 2014, 10 pages, [Online] [Retrieved on Sep. 14, 2016], Retrieved from the Internet<URL:http://ieeexplore.ieee.org/stamp/stamp.jsp?tp-&arnumber=6968348&isnumber=6968191>.

PCT International Search Report and Written Opinion, PCT Application No. PCT/US16/44178, dated Oct. 18, 2016, 20 pages.

Peng, S. et al., "Query Optimization for Differentially Private Data Management Systems", ICDE Conference 2013, pp. 1093-1104.

Xiao, X. et al., "iReduct: Differential Privacy with Reduced Relative Errors", SIGMOD' 11, Jun. 12-16, 2011, pp. 229-240.

Zhang, N. et al., "Distributed Data Mining with Differential Privacy", IEEE ICC 2011 proceedings, 5 pages.

Dankar, F. et al., "Practicing Differential Privacy in Health Care: A Review," Transactions on Data Privacy, 2013, vol. 5, pp. 35-67.

Extended European Search Report and Written Opinion, European Application No. 16862625.7, Mar. 27, 2019, 9 pages.

Kellaris, G. et al., "Practical differential privacy via grouping and smoothing," Proceedings of the VLDB Endowment, Mar. 1, 2013, vol. 6, No. 5, pp. 301-312.

\* cited by examiner

| Entry # | Feature 1 (cm) | Feature 2 (residence) |
|---|---|---|
| 1 | 163 | Italy |
| 2 | 136 | England |
| 3 | 180 | France |
| 4 | 347 | USA |
| 5 | 388 | China |
| 6 | 145 | France |
| 7 | 169 | Korea |
| 8 | 158 | USA |

. . .

| Feature 10 (age) | Feature 11 (Disease) |
|---|---|
| 37 | 0 |
| 87 | 0 |
| 54 | 1 |
| 34 | 0 |
| 18 | 0 |
| 13 | 1 |
| 65 | 1 |
| 17 | 1 |

Table B

| KeySet | Col 610C |
|---|---|
| ABC | 987 |
| | 654 |
| | 321 |

| KeySet | Col 610D |
|---|---|
| DEF | 147 |
| | 258 |
| | 369 |

*FIG. 4B*

Table A

| KeySet | Col 610A |
|---|---|
| ABC DEF | 123 |
| | 456 |
| | 789 |

| KeySet | Col 610B |
|---|---|
| GHI | Alice |
| | Bob |
| | Claire |

DIFFERENTIALLY PRIVATE DATABASE PERMISSIONS SYSTEM

BACKGROUND

Field of Disclosure

The present invention generally relates to access control for computer databases, and more specifically to a database permissions system that preserves differential privacy of accessed data.

Description of the Related Art

Data about people, such as health data, financial records, location information, web browsing, and viewing habits, is valuable for analysis and collaboration. There are many technologies in which statistical or predictive analysis of personal data is beneficial. For example, medical research institutions use medical information about populations of individuals to support epidemiologic studies. Map providers use location information gathered from mobile devices carried by people to determine traffic information and provide routing guidance. Technology companies collect information describing behaviors of Internet users to improve their offerings, such as by redesigning user interfaces to improve human-computer interactions, making improved recommendations, and offering sponsored messages.

However, the personal nature of this data limits its usefulness. Government regulations provide strict rules about how personal data can be collected, used, and shared. Individuals also have expectations about how their personal data will be used, and may react negatively if it is publicly disclosed. As a result, companies that collect and maintain personal data seek ways to extract value from it without running afoul of such rules and expectations.

One set of techniques for using personal data involves removing personally-identifiable information from the data through masking, hashing, anonymization, aggregation, and tokenization. These techniques tend to be resource intensive and may compromise analytical utility. For example, data masking may remove or distort data, compromising the statistical properties of the data.

An additional technique makes use of differential privacy. Differential privacy is technology that injects noise into results provided by statistical databases in order to protect private information. Within this technological space, issues arise over how to add noise in view of different use cases, and how much noise to add. The answers to these questions can be complex due to the potential resources available to determined adversaries (e.g., the computing power available to a potential attacker trying to gain access to the private data), the resources (e.g., computing power) available to the database, and the types of queries supported by the database.

The differentially private approaches can protect the data in the database but are not necessarily suited for environments where multiple analysts are accessing the data for different purposes. It may be useful in these types of environments to provide different analysts with different levels of access to the data. For example, some analysts may perform analyses that require full access to the underlying data, while other analysts are performing analyses that are satisfied using differentially private data. It may also be useful to provide an analysts to different levels of access to different types of data in the database. For example, an analyst may have full access to some data but only differentially private access to other data. Managing database permissions in these situations is a complex and difficult problem.

SUMMARY

A differentially private system is communicatively coupled to a database including restricted data. The differentially private system includes a differentially private permissions system. The differentially private system receives a request from a client to perform a query on data stored in a database. The differentially private permissions system establishes a set of permissions of the client with respect to the data in the database. The user is associated with a set of zero or more permissions grants, such as admin permission, database permission, table permission, or column permission. Column permissions may be export permissions, non-private compute permissions, private compute permissions, or compare permissions.

The differentially private permissions system deconstructs the query into query components. The query components include at least one relation that identifies a dataset in the database and at least one expressions specifying an operation to be performed in the identified dataset. The differentially private permissions system identifies permissions necessary to perform the specified operation on the identified dataset, such as through mutually recursive traversal of the query.

The differentially private permissions system determines whether the established permissions grants of the client include the identified permissions necessary to perform the specified operation on the identified dataset. If the established permissions grants include the necessary permissions, the differentially private system performs the operation. If the established permissions grants do not include the necessary permissions, the differentially private permissions system blocks the query and may report the block to the client.

BRIEF DESCRIPTION OF DRAWINGS

FIG. 2 illustrates an example database structure, according to one embodiment.

FIGS. 4A-B illustrates an example involving use of obfuscation keys, according to one embodiment.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

System Overview

Figure 1:
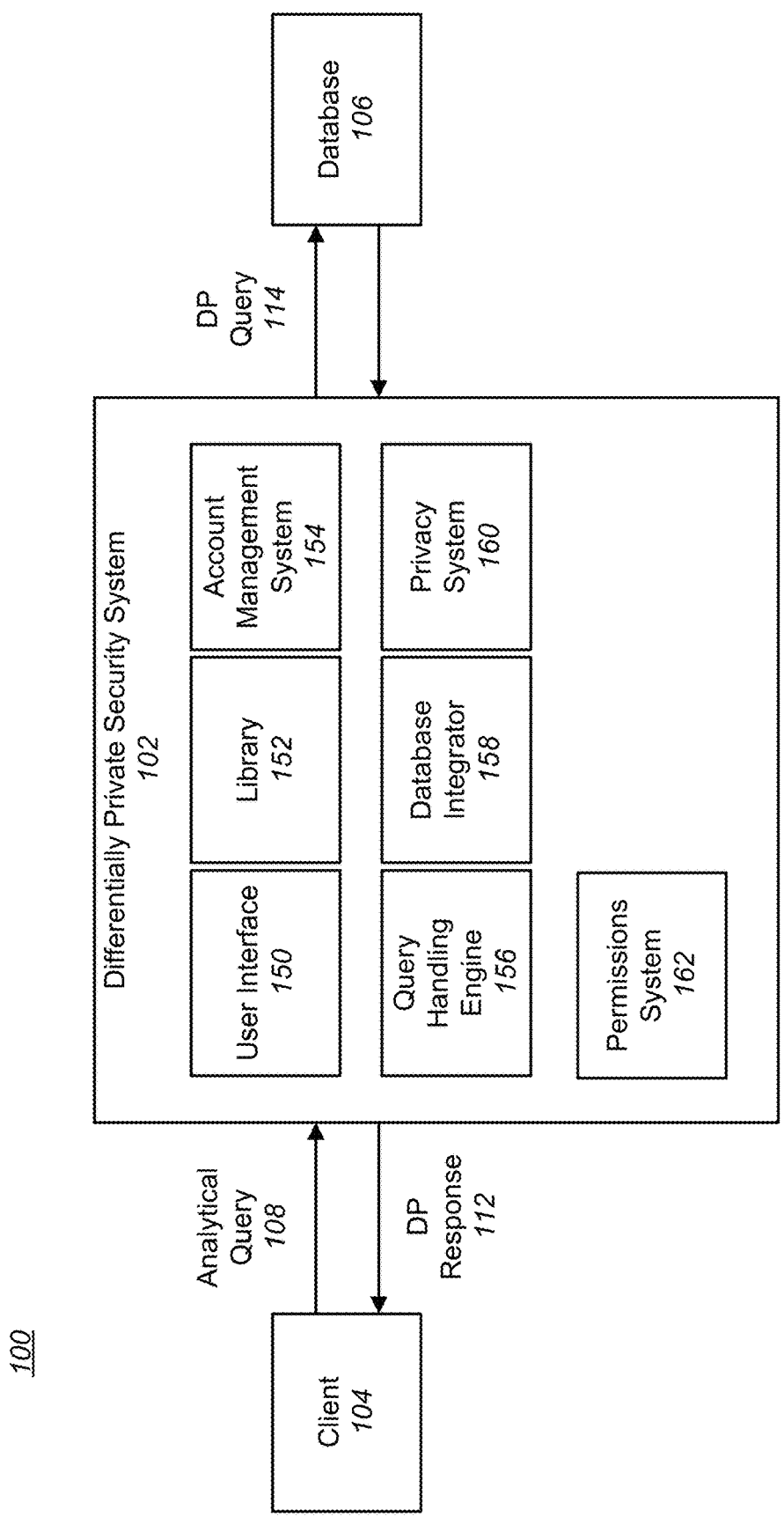
FIG. 1 illustrates a system for receiving a query for a database, and responding to the query by executing the query in a differentially manner, according to one embodiment.

FIG. 1 is a system 100 for receiving a query 108 for a database 106, and responding to the query 108 by executing the query in a differentially private (DP) manner, according to one embodiment. The system 100 includes a differentially private security system (DP system) 102 that receives an analytical query 108 from a client 104 and applies a DP version of the query 114 on the database 106. Subsequently, the DP system 102 returns the response of the DP query 114 to the client 104 as the DP response 112.

The database 106 is one or more databases managed by one or more entities. The database 106 may be managed by the same entity that manages the DP system 102 or by a different entity. The database 106 stores at least some restricted data. The restricted data may be represented as rows of records, with each record having a set of columns holding values pertaining to the record.

Restricted data is data to which access and/or usage is limited due to legal, contractual, and/or societal concerns. Examples of restricted data include health data of patients and financial records of people, businesses or other entities. Similarly, restricted data may include census data or other forms of demographic data describing people, businesses, or other entities within geographic areas. Restricted data also includes usage data describing how people interact with electronic devices and/or network-based services. For example, restricted data may include location data describing geographic movements of mobile devices, consumption history data describing how and when people consume network-based content, and the particular content consumed (e.g., music and/or video content), and messaging data describing when and to whom users send messages via mobile or other electronic devices.

A client 104 is used to access the restricted data in the database 106. A client 104 is an electronic device such as a desktop, laptop, or tablet computer or a smartphone used by a human user to access the database 106. The client 104 and user may be, but are not necessarily, associated with the entities that manage the database 106 and/or DP system 102. Users of the client 104 include administrators and analysts. Administrators use the clients 104 to access the DP system 102 and/or database 106 to perform administrative functions such as provisioning other users and/or clients 104, and configuring, maintaining, and auditing usage of the system and/or database. The administrators may access the DP system 102 and database 106 directly via administrative interfaces that allow users with appropriate credentials and access rights to perform the administrative functions.

Analysts use the clients 104 to apply analytical queries 108 to the restricted data in the database 106. The clients 104 used by the analysts access the database 106 only through the DP system 102. Depending upon the embodiment, the analyst and/or client 104 may have an account provisioned by an administrator which grants the analyst or client certain rights to access the restricted data in the database 106.

The rights to the restricted data may be specified in terms of a privacy budget. The privacy budget describes limits on how much of the restricted data can be released. In one embodiment, the privacy budget is a numerical value representative of a number and/or type of remaining queries 108 available. The privacy budget may be specified in terms of a query, analyst, client 104, entity, globally, and/or time period. For example, the privacy budget may specify limits for an individual query, with each query having a separate budget. The privacy budget may also specify limits for an analyst or client, in which case the budget is calculated cumulatively across multiple queries from a client or analyst. For a privacy budget specified for an entity, such as an organization having multiple clients 104 and users, the privacy budget is calculated cumulatively across the multiple queries from clients and users associated with the entity. A global privacy budget, in turn, is calculated across all queries to the database, regardless of the source of the query. The privacy budget may also specify an applicable time period. For example, the privacy budget may specify that queries from particular clients may not exceed a specified budget within a given time period, and the budget may reset upon expiration of the time period. Depending upon the embodiment, clients, as used herein, may alternatively or additionally refer to users using the clients to access the DP system 102, to user accounts registered with the DP system 102 such as accounts associated with a permissions grant, and/or to other entities that are sources of queries.

As discussed above, a client 104 sends an analytical query 108 to the DP system 102 and also receives a differentially private response 112 to the query from the system. The queries 108 submitted by the client 104 may be simple queries, such as count queries that request the number of entries in the databases 106 that satisfy a condition specified by the client 104, or complicated queries, such as predictive analytics queries that request a data analytics model trained on the databases 106. Specific types of queries are discussed in more detail below.

Each query has an associated set of privacy parameters. The privacy parameters indicate the amount of restricted data to release from the database 106 to the client 104 in response to the query 108. The privacy parameters likewise indicate the amount of decrease in the relevant privacy budget (e.g., the budget for the client 104 or entity with which the client is associated) in response to the query 108. In one embodiment, the client 104 specifies a set of associated privacy parameters with each submitted query 108. In other embodiments, the privacy parameters are specified in other ways. The DP system 102 may associate privacy parameters with received queries (rather than obtaining the parameters directly from the query). For example, the DP system 102 may apply a default set of privacy parameters to queries that do not specify the parameters. The values of the default privacy parameters may be determined based on the client 104, analyst, query type, and/or other factors.

The DP system 102 receives an analytical query 108 from the client 104 and returns a differentially private response 112 to the client. In one embodiment, the DP system 102 determines the privacy parameters associated with the query, and evaluates the parameters against the applicable privacy budget. If the analytical query 108 and associated privacy parameters exceeds the privacy budget, the DP system 102 may deny (i.e., not execute) the query. Alternatively, the DP system 102 may adjust the privacy parameters to fall within the privacy budget, and execute the query using the adjusted privacy parameters. If the privacy parameters do not exceed the privacy budget, the DP system 102 executes a DP version of the query 114 on the database 106, such that it releases a degree of restricted data from the database 106 indicated by the privacy parameters specified by the client 104, and also protects a degree of privacy of the restricted data specified by the privacy budget. For example, an administrator of the database 106 may set a privacy budget specifying a maximum threshold on the amount of restricted data released by given query 108 that the client 104 may not exceed. Thus, the DP system 102 balances privacy protection of the restricted data in the database 106 while releasing useful information on the database 106 to the client 104.

The DP query 114 applied to the database 106 by the DP system 102 is a differentially private version of the query 108 that satisfies a definition of differential privacy described in more detail with reference to the privacy system 160 in FIG. 3. The DP system 102 may apply the DP query 114 to the database 106 by transforming the analytical query 108 into one or more queries derived from the analytical query that cause the database 106 to release differentially private results. The DP system 102 may then return these differentially private results to the client as the DP response 112. The DP system 102 may also, or instead, apply the DP query 114 to the database 106 by transforming the analytical query into one or more derived queries that cause the database to release results that are not necessarily differentially private. The DP system 102 may then transform the released results in a way that enforces differential privacy to produce the DP response 112 returned to the client 104. These transformations may involve perturbing the process by which the DP query 114 is produced from the analytical query 108 and/or the perturbing the results released by the database 106 with noise that provides the differential privacy specified by the privacy parameters while enforcing the privacy budget.

The DP system 102 allows an analyst to perform database queries on restricted data, and thereby perform analyses using the DP responses 112 returned by the queries, while maintaining adherence with privacy parameters and a privacy budget. In addition, the techniques used by the DP system 102 allow database queries to access restricted data in ways that do not compromise the analytical utility of the data. The DP system 102 supports a wide variety of analytical and database access techniques, described in more detail below, and provides fine-grained control of the privacy parameters and privacy budget when using such techniques. The DP system 102 thus provides an improved database system having expanded and enhanced access to restricted data relative to other database systems.

An analyst can use the DP system 102 for a variety of different purposes. In one embodiment, the restricted data in the database 106 includes training data describing features of entities relevant to a particular condition. The analyst uses the DP system 102 to build one or more differentially private machine-learned models, such as classifiers, from the training data. The analyst can apply data describing a new entity to the machine-learned models, and use the outputs of the models to classify the new entity as having, or not having the condition. However, an adversary cannot use the information in the machined-learned models to ascertain whether individual entities described by the training set have the condition due to the differentially private nature of the models.

Such models may be retained and executed within the DP system 102. For example, an analyst can issue an analytical query 108 that causes the DP system 102 to interact with the restricted data in the database 106 to build the machine-learned models. The DP system 102 can then store the models within the system or an associated system. The analyst can use a new analytical query 108 or another interface to the system 102 to apply the data describing the new entity to the models. The DP system 102 can execute the new data on the stored models and output the classification of the entity as a DP response 112. Alternatively or in addition, the DP system 102 can output the trained models as a DP response 112, and an analyst can store and apply data to the models using different systems in order to classify the entity.

Examples of the types of classifications that may be performed using such models include determining whether a person (the entity) has a medical condition. In this example, the restricted training data include health data describing patients that are labeled as having or not having a given medical condition. The analyst applies health data for a new patient to the one or more differentially private machine-learned models generated from the restricted training data in order to diagnose whether the new patient has the medical condition.

Another example classification that may be performed using such models involves identifying fraudulent or otherwise exceptional financial transactions. In this example, the restricted training data includes financial transaction data associated with one or more people or institutions, where the transactions are labeled as being exceptional or not exceptional. The analyst applies financial transaction data for a new transaction to the one or more differentially private machine-learned models generated from the restricted training data in order to determine whether the new transaction is exceptional. The analyst can block, flag, or otherwise report an exceptional transaction.

As shown in FIG. 1, the DP system 102 includes a user interface 150, a library 152, an account management system 154, a query handling engine 156, a data integration module 158, a privacy system 160, and a permissions system 162. Some embodiments of the DP system 102 have different or additional modules than the ones described here. Similarly, the functions can be distributed among the modules in a different manner than is described here. Certain modules and functions can be incorporated into other modules of the DP system 102.

The user interface 150 generates a graphical user interface on a dedicated hardware device of the DP system 102 or the client 104 in which the client 104 can submit an analytical query 108 and the desired privacy parameters, view the DP response 112 in the form of numerical values or images, and/or perform other interactions with the system. The client 104 may also use the graphical user interface to inspect the database 106 schemata, view an associated privacy budget, cache the DP response 112 to view the response later, and/or perform administrative functions. The user interface 150 submits properly formatted query commands to other modules of the DP system 102.

The library 152 contains software components that can be included in external programs that allow the client 104 to submit the analytical query 108, receive the DP response 112, and other functions within a script or program. For example, the client 104 may use the software components of the library 152 to construct custom data analytic programs. Each of the software components in the library 152 submits properly formatted query commands to other modules of the DP system 102.

The account management system 154 receives properly formatted query commands (herein "query commands" or "QC"), parses the received query commands, and verifies that the commands are syntactically correct. In one embodiment, the account management system 154 provides the query commands to the permissions system 162 to determine whether the user has appropriate permissions to execute the query. If the user lacks permission, the account management system 154 may deny execution of the query and output a report to the user indicating that the query was denied. If the user has permission, the account management system 154 passes the query commands to the query handling engine 156.

Examples of query commands accommodated by the DP system 102 are listed below.

QC1. Count
'SELECT COUNT (<column>) FROM <database.table>WHERE <where_clause>BUDGET <eps><delta>.

QC2. Median
'SELECT MEDIAN (<column>) FROM <database.table>WHERE <where_clause>BUDGET <eps><delta>.

QC3. Mean
'SELECT MEAN (<column>) FROM <database.table>WHERE <where_clause>BUDGET <eps><delta>.

QC4. Variance
'SELECT VARIANCE (<column>) FROM <database.table>WHERE <where_clause>BUDGET <eps><delta>.

QC5. Inter-Quartile Range
'SELECT IQR (<column>) FROM <database.table>WHERE <where_clause>BUDGET <eps><delta>.

QC6. Batch Gradient Descent
'SELECT <GLM>(<columns_x>,<column_y>,<params>) FROM <database.table>WHERE <where_clause>BUDGET <eps><delta>.

QC7. Stochastic Gradient Descent
'SELECT SGD <GLM>(<column>) FROM <database.table>WHERE <where_clause>BUDGET <eps><delta>.

QC8. Random Forest
'SELECT RANDOMFOREST (<columns_x>,<columns_y>) FROM <database.table>WHERE <where_clause>BUDGET <eps><delta>.

QC9. Histogram
'SELECT HISTOGRAM (<column>) FROM <database.table>WHERE <where_clause_i>BUDGET <eps><delta>.

The query handling engine 156 transforms the received query commands into appropriate function calls and database access commands by parsing the query command string. The function calls are specific to the query 108 requested by the client 104, and the access commands allow access to the required database 106. Different databases 106 require different access commands. The access commands are provided to the database integrator 158.

The database integrator 158 receives the access commands to one or more databases 106, collects the required databases, and merges them into a single data object. The data object has a structure similar to that of a database structure described in reference to FIG. 2. The data object is provided to the privacy system 160.

The privacy system 160 receives the data object from the database integrator 158, appropriate function calls from the query handling engine 156 indicating the type of query 108 submitted by the client 104, and privacy parameters specified for the query 108. The privacy system 160 evaluates the privacy parameters against the applicable privacy budget and either denies or allows the query. If the query is denied, the privacy system 160 outputs a response indicating that the query did not execute. If the query is allowed, the privacy system 160 executes the query and outputs a DP response 112 to a differentially private version of the query 108 with respect to the database 106. The privacy system 160 may also decrement the applicable privacy budget to account for the executed query.

The permissions system 162 provides differentially private access control to the database 106. The access control can provide different levels of access to data in the database to different clients (which may include different users and/or other entities). For example, the permissions system 162 can provide one client with differentially private access to all of the data, provide another client with differentially private access to some data while providing full access to other data, and provide a third client with full access to all of the data in the database.

In one embodiment, the permissions system 162 operates to selectively allow or deny a query depending upon the access rights (i.e., permissions) of the client performing the query. The permission system 162 receives the query commands from the account management system 154 and evaluates the query commands against the access rights to determine whether the rights are sufficient to perform the query. If the access rights are sufficient, the permissions system 162 outputs a report to the account management system 154 indicating that the client has the required permissions. If the access rights are insufficient, the permissions system 162 outputs a report indicating that the client lacks the required permissions.

The permissions system 162 thus allows the DP system 102 to provide fine-grained access control to the data in the database 106. The permissions can provide different clients with different levels of access to different data, within the context of a differentially private system. Accordingly, the performance of the database is improved by providing for better security for the data and more selective access to the data, as well as better utilization of the data, relative to conventional databases.

FIG. 2 illustrates an example database structure, according to one embodiment. For the remainder of the application, a database, including one or more of the databases 106, may be referred to as a matrix with a number of rows and columns. Each row is an entry of the database and each column is a feature of the database. Thus, each row contains a data entry characterized by a series of feature values for the data entry. For example, as shown in FIG. 2, the example database 200 contains 8 entries and 11 features, and illustrates a list of patient profiles. Each patient is characterized by a series of feature values that contain information on the patient's height (Feature 1), country of residence (Feature 2), age (Feature 10), and whether the patient has contracted a disease (Feature 11). A row is also referred to as a "record" in the database 106.

The feature values may be numerical in nature, e.g., Features 1 and 10, or categorical in nature, e.g., Features 2 and 11. In the case of categorical feature values, each category may be denoted as an integer. For example, in Feature 11 of FIG. 2, "0" indicates that the patient has not contracted a disease, and "1" indicates that the patient has contracted a disease.

Definition of Differential Privacy

For a given query 108, the privacy system 160 receives a data object X, function calls indicating the type of query 108, privacy parameters specified by the client 104, and outputs a DP response 112 to a differentially private version of the query 108 with respect to X. Each data object X is a collection of row vectors $x_{i=1, 2, \ldots, n}$, in which each row vector $x_i$ has a series of p elements $x_i^{j=1, 2, \ldots, p}$.

A query M satisfies the definition of ε-differential privacy if for all:

$$\forall X, X' \in \mathbb{D}, \forall S \subseteq \text{Range}(M): \frac{Pr[M(X) \in S]}{Pr[M(X') \in S]} \leq e^\varepsilon$$

where $\mathbb{D}$ is the space of all possible data objects, S is an output space of query M, and neighboring databases are defined as two data objects X, X' that have at most one different entry from one another. That is, given two neighboring data objects X, X' in which one has an individual's data entry, and the other does not, there is no output of query M that an adversary can use to distinguish between X, X'. That is, an output of such a query M that is differentially private reveals no information about the data object X. The privacy parameter ε controls the amount of information that the query M reveals about any individual data entry in X, and represents the degree of information released about the entries in X. For example, in the definition given above, a small value of ε indicates that the probability an output of query M will disclose information on a specific data entry is small, while a large value of e indicates the opposite.

As another definition of differential privacy, a query M is (ε,δ)-differentially private if for neighboring data objects X, X':

$$\forall X, X' \in \mathbb{D}, \forall S \subseteq \text{Range}(M): \frac{Pr[M(X) \in S]}{Pr[M(X') \in S]} \leq e^\varepsilon + \delta.$$

The privacy parameter δ measures the improbability of the output of query M satisfying ε-differential privacy. As discussed in reference to FIG. 1, the client 104 may specify the desired values for the privacy parameters (ε,δ) for a query 108.

There are three important definitions for discussing the privacy system 160: global sensitivity, local sensitivity, and smooth sensitivity. Global sensitivity of a query M is defined as $$GS_M(X) = \max_{X, X': d(X, X')=1} \|M(X) - M(X')\|$$

where X, X' are any neighboring data objects, such that $d(X, X')=1$. This states that the global sensitivity is the most the output of query M could change by computing M on X and X'.

The local sensitivity of a query M on the data object X is given by:

$$LS_M(X) = \max_{X': d(X, X')=1} \|M(X) - M(X')\|$$

where the set $\{X': d(X, X')=1\}$ denotes all data objects that have at most one entry that is different from X. That is, the local sensitivity $LS_M(X)$ is the sensitivity of the output of the query M on data objects X' that have at most one different entry from X, measured by a norm function.

Related to the local sensitivity $LS_M(X)$, the smooth sensitivity given a parameter β is given by:

$$S_M(X; \beta) = \max_{X' \in \mathbb{D}} \|LS_M(X) \cdot e^{-\beta \cdot d(X, X')}\|$$

where d(X, X') denotes the number of entries that differ between X and X'.

Notation for Random Variables

The notation in this section is used for the remainder of the application to denote the following random variables.

1) $G(\sigma^2)$, denotes a zero-centered Gaussian random variable with the probability density function $$f(x | \sigma^2) = \frac{1}{\sigma \sqrt{2\pi}} e^{-\frac{x^2}{2\sigma^2}}.$$

2) L(b) denotes a zero-centered Laplacian random variable with the probability density function $$f(x | b) = \frac{1}{2b} e^{-\frac{|x|}{b}}.$$

3) C(γ) denotes a zero-centered Cauchy random variable with the probability density function $$f(x | \gamma) = \frac{1}{\pi \gamma \left(1 + \left(\frac{x}{\gamma}\right)^2\right)}.$$

Further, a vector populated with random variables R as its elements is denoted by v(R). A matrix populated with random variables R as its elements is denoted by M(R).

Figure 3:
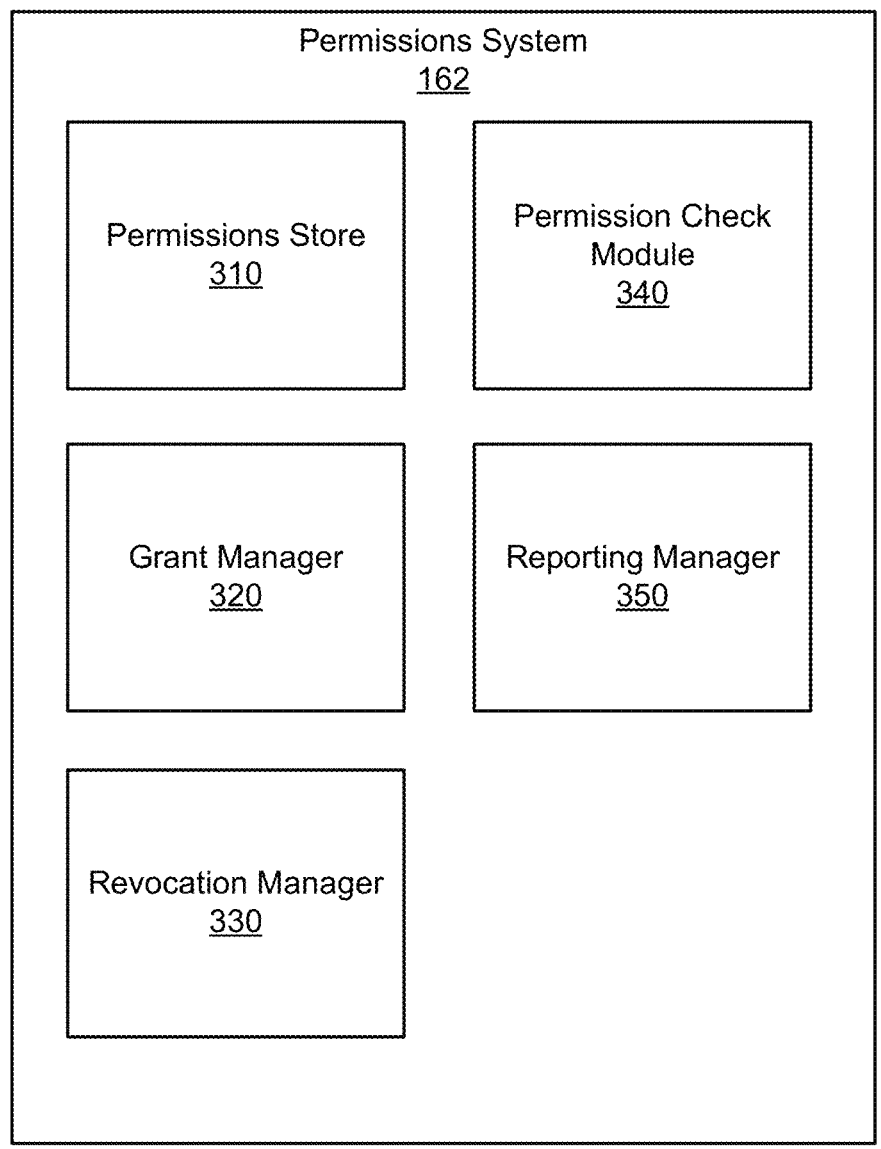
FIG. 3 illustrates a permissions system, according to one embodiment.

FIG. 3 illustrates the permissions system 162, according to one embodiment. The permissions system 162 includes a permissions store 310, a grant manager 320, a revocation manager 330, a permission check module 340, and a reporting manager 350.

The permissions store 310 stores data describing permissions granted to clients 104 (which may include users or other entities) using the DP system 102. The permissions store 310 stores the permissions for a given client 104 as a set of zero or more "grants" to the client. The permissions store 310 may store the grants in a database, such as a relational or non-relational database. The permissions store 310 updates the grants for a client as the grants change based on inputs from the grant manager 320 and the revocation manager 330.

In one embodiment, there is a set of discrete permissions that may be granted to each client 104. The permissions store 310 maintains, for each client 104, data describing which of these permissions are granted to that client. Some permissions are dependent on other permissions in a hierarchical relationship. An explicit grant of a first permission to a client implicitly and automatically grants any permission that are dependent on the first permission to the same client. The permissions store 310 also maintains a flag associated with each permission granted to a client indicating whether the permission was granted explicitly or implicitly. The flag may be represented as "manual" flag that is set to true if the associated permission was explicitly granted, and is set to false if the associated permission was implicitly granted.

An admin permission grants a client 104 administrative privileges for the DP system 102. The admin permission enables a client with such a grant to create, alter, and delete client (and/or user) accounts, databases, and tables within the DP system 102. The admin permission implicitly grants all other permissions. For example, a client with the admin permissions grant can add a new client to the DP system 102 and grant/revoke permissions for the new client. Likewise, the client with the admin permission grant can view, delete, and alter data in the database 106.

A database permission grants a client the ability to inspect the database 106. That is, the client 104 can view information about the database 106 but cannot view the actual data recorded within it. For example, the client 104 can determine which data tables are in the database 106, view descriptions and schemata of the data tables, see the size of the database, and access other metadata of the database.

A table permission grants a client 104 the ability to inspect a particular table of the database 106. The table permission is similar to the database permission, except that the grant is specific to the particular table in the database. A client 104 with a table permission grant can access the name, size, schemata, and metadata of the table. However, a client 104 with table permissions alone is unable to access the access the data stored within the table and unable to access information about other tables in the database 106.

A column permission grants a client 104 the ability to access a particular column within a table of the database 106. The column permission allows the client to access the data within the column, with the degree of access depending upon the type of permission as described below. The explicit grant of a column permission implicitly grants table permission for the table containing the column, and also implicitly grants database permission for the database containing the table/column.

There are several different types of column permission grants, with each type specifying a different degree of access to the data within the column. The column permission grants include compute, export, and compare grants. A compute grant gives the client 104 permission to perform analytical computations on the data within the column. For example, a client 104 with the compute grant can run queries that ask for aggregates or perform other statistical functions on the values in the column.

In one embodiment, a compute grant may be classified as private or non-private. A client 104 with a private compute grant can compute a private (i.e., with differential privacy applied) analytical or aggregate function over a column, such as a differentially private mean. A client 104 with a non-private compute grant can compute a non-differentially private (i.e., with the real data) analytical or aggregate function over a column, such as a mean or standard deviation. The explicit grant of non-private compute permissions implicitly grants private compute permissions.

The export permission grant gives a client 104 permission to directly access the individual records in a column, without applying differential privacy. For example, the user could directly export the column from the DP system 102. The explicit grant of export permissions to a client 104 implicitly grants private and non-private compute permissions.

The compare permission grant gives a client 104 permission to compare a column with one or more other columns, provided that all of the columns being compared share the same obfuscation key. In one embodiment, columns within the database 106 can be assigned zero or more obfuscation keys (e.g., by an administrator with admin permissions). An obfuscation key is a value, such as a text string, that identifies a group to which a column belongs. Typically, columns of similar type and/or representing similar concepts are associated with the same obfuscation keys. One example of a compare operation is an equality operation, e.g. determining whether a particular record has the same value in each of two columns being compared. Other compare operations include greater than, less than, greater than or equal to, less than or equal to, and not equal to.

In an embodiment, there are private and non-private compare permissions. The private compare permission allows a client 104 to perform differentially private column comparisons while the non-private compare permission allows a client to perform non-differentially private column comparisons. An explicit grant of the non-private compare permission implicitly grants the private compare permission. Whether a compare is private or non-private may depend upon other expressions within the overall query.

The grant manager 320 gives permissions grants to users. For example, an administrator can use the grant manager 320 to explicitly grant a particular permission to a particular client 104, such as a database permissions grant. The grant manager 320 records grants in the permissions store 310 in association with the clients given the grants.

If an explicit grant is made to a client 104, the grant manager 320 updates the data in the permission store 310 to reflect that the client has the explicit permission. That is, the grant manager 320 sets the manual flag associated with the client/permission pair to true to reflect that the permission was explicitly granted. The grant manager 320 further determines whether the explicit grant also makes implicit grants to the client 104. This determination may be made, for example, by executing logic that enforces the relationships among permission grants described above. The grant manager 320 updates the data in the permissions store 310 to make the implicit permission grants, and sets the manual flag to denote that the grants are implicit.

The revocation manager 330 revokes permissions grants from users. For example, an administrator can use the revocation manager 330 to revoke a particular permission from a particular client 104, such as a database permissions grant. Revocation of a grant may also be induced by changes to the database 106, such as deletion of a table, which would also revoke any column grants or table grants to the deleted table.

In one embodiment, the revocation manager 330 revokes a permission grant using a recursive process that returns the state of the permissions store 310 to the same state as before the permission was granted. In this process, the revocation manager 330 first recursively revokes all permissions which depend on (i.e., which were implicitly granted from) the revoked permission. Next, the revocation manager 330 updates the permission store 310 to indicate that the associated client 104 no longer has the revoked permission. Then, the revocation manager 330 revokes each permission the revoked permission grant previously depended on, unless the manual flag for the permission is set to true (i.e., the permission was explicitly granted), or if it is transitively dependent upon another permissions grant with a manual flag set to true. An example of a grant revocation is described below with reference to FIG. 5.

The permission check module 340 performs permissions checks for queries to the database 106. A permission check determines whether a client 104 has the appropriate permissions required to execute a given query. The permission check module 340 allows a query to execute if the client 104 has the appropriate permissions, and blocks the query if the client lacks the appropriate permissions.

To perform the permissions check, the permissions check module 340 parses the query to tokenize it into query components including relations and expressions. As used herein, a "relation" is a query component that specifies a dataset in the database 106. That is, a relation identifies set of data within the database that is to be operated on. An "expression," in turn, is a query component that specifies an operation to be performed on a dataset identified by a relation. Relations and expressions can be nested, such that a particular relation or expression is formed from a combination of other relations and/or expressions.

An embodiment of the permission check module 340 uses a recursive analysis to verify that the client 104 has the appropriate permission grant to perform the expressions on the relations within the query. If, at any stage within the analysis, the permission check module 340 determines that the client 104 lacks the permission grant, then the permission check module 340 exits the analysis and reports that the client lacks the permission, thereby blocking the query from executing.

The permissions check module 340 uses a set of mutually recursive functions to recursively check the relations and expressions found within the query components. Each function performs a check of whether the querying client 104 has a particular permission, and a given function may recursively call itself or another function as part of the check. In an embodiment, there are six mutually recursive functions: "CheckRelExpr," "CheckByIndex," "GuardRowCounts," "Comparable," "ExprObfKeys," and "IndexObfKeys." These functions may differ in alternative embodiments. Furthermore, alternative embodiments may use fewer, different, or additional functions to perform the checks. Various Structured Query Language ("SQL") terms are used herein for purposes of clarity, to designate various concepts. In other embodiments, other terms may be used to designate the same or similar concepts, for which the techniques described herein remain valid.

CheckRelExpr determines whether the client 104 has the permission grants necessary to execute a relation and expression pair included in the query. CheckRelExpr calls GuardRowCounts to check whether the relation is permissible, then recursively deconstructs the expression. In the recursive deconstruction, CheckRelExpr calls CheckByIndex on each of its leaf attributes, which are query components. However, if a query component is a compare operation, e.g. EQU, NEQ, or IS_NULL, CheckRelExpr calls Comparable on it instead of CheckByIndex.

CheckByIndex determines whether the client 104 has the permissions grants necessary to take an action upon a particular column described by a relation. CheckByIndex calls GuardRowCounts upon the relation and deconstructs the relation to determine its type.

CheckByIndex performs a check based on the determined type of relation. For a TABLE type, CheckByIndex checks whether the client 104 has a permissions grant for the table. For a FROM type, CheckByIndex identifies a corresponding expression and calls CheckRelExpr upon it. For a UNION, EXCEPT, or INTERSECT type, CheckByIndex deconstructs the relation and calls CheckByIndex upon each underlying relation. For a GROUP_BY type, CheckByIndex calls CheckRelExpr on a corresponding expression. If all keys have export permissions or no keys are used in the GROUP_BY and the permissions type requested in the query is export, CheckByIndex calls CheckRelExpr on the corresponding expression, but for a non-private permissions check rather than export. If the corresponding expression is COUNT or COUNT_DISTINCT, CheckByIndex calls Comparable rather than CheckRelExpr. For EQUIJOIN CheckByIndex checks the columns in the subrelations of the EQUIJOIN. For the remaining relation types, e.g. WHERE, SPLIT, DISTINCT, and DROP_DUPLICATES, CheckByIndex deconstructs the relation and calls CheckByIndex upon the underlying relation.

GuardRowCounts determines whether the client 104 has any permission grants for a particular relation. In an embodiment, GuardRowCounts determines whether the client 104 has any permissions for the particular relation by checking whether GuardRowCounts deconstructs the relation and calls GuardRowCounts on each sub-relation. Depending upon the type of relation of each sub-relation, GuardRowCounts may perform additional actions for the sub-relation. For WHERE, GuardRowCounts calls CheckRelExpr on the WHERE expression. For DISTINCT, SET_UNION, EXCEPT, and INTERSECT, GuardRowCounts deconstructs the relation and calls Comparable on each column of each sub-relation. For DROP_DUPLICATES, GuardRowCounts deconstructs the relation and calls Comparable on all columns specified by the DROP_DUPLICATES. For ORDER_BY, GuardRowCounts calls CheckRelExpr on the ordering expressions of the ORDER_BY. For GROUP_BY, GuardRowCounts calls Comparable on each key expression.

Comparable determines whether a list of expression-relation pairs share one or more obfuscation keys by mapping ExprObfKeys over the list and taking the intersection of the mapping. If the intersection is empty, Comparable reports that the client 104 lacks permission for the query.

ExprObfKeys operates in conjunction with Comparable and IndexObfKeys to check whether the client 104 has the permission grants necessary for a comparison operation. ExprObfKeys calls GuardRowCounts for each expression-relation pair in a list and returns an empty list. In an embodiment, there are three exceptions. For ATTRIBUTE, ExprObfKeys returns the result of calling IndexObfKeys on the underlying column of the ATTRIBUTE. For COALESCE, ExprObfKeys takes the intersection of calling ExprObfKeys on each subexpression. For DECODE, ExprObfKeys returns an empty list if the client 104 does not have the correct permissions for the decode key, otherwise ExprObfKeys takes the intersection of each value sub-expression.

IndexObfKeys checks whether columns involved in a comparison share obfuscation keys. IndexObfKeys calls GuardRowCounts, then checks the obfuscation keys of each column. For TABLE, IndexObfKeys directly checks the obfuscation keys. For FROM, IndexObfKeys calls ExprObfKeys. For UNION, EXCEPT, and INTERSECT, IndexObfKeys takes the intersection of IndexObfKeys for each column over each sub-relation. For GROUP_BY, IndexObfKeys calls ExprObfKeys and returns empty for the aggregations. For JOIN, IndexObfKeys directly checks the obfuscation keys. For the remaining relation types, e.g. WHERE, SPLIT, DISTINCT, and DROP_DUPLICATES, IndexObfKeys calls IndexObfKeys on the underlying relation.

Compare permissions generally do not propagate through expressions, though it may depend upon the embodiment. For example, a query "SELECT x FROM s JOIN t ON s.y=(t.y+1)" would be disallowed even if the client 104 has compare permissions on both s.y and t.y, due to the "+1" expression. Some embodiments may include specialized handling for expressional operators that pass unchanged data or that only involve nullability. For example, for IS_NULL, the permissions system 162 may act as if the user has export permissions if the sub-expression of IS_NULL has a compare permission. For COALESCE, if each sub-expression shares an obfuscation key, the obfuscation key propagates through the expression. For DECODE, if the expression is visible, e.g. the user has export, private, or non-private permissions grants, and all the value subexpressions share an obfuscation key, the obfuscation key propagates through the expression. In an embodiment, counts and distinctness checks can be used on columns for which the client 104 has only compare permissions grants.

The reporting module 350 outputs a report describing the result of the permission check performed by the permission check module 340. In one embodiment, the reporting module 350 outputs the report to the account management system 154. If the permission check is successful, the account management system 154 allows the query to execute. If the permissions check is unsuccessful, the account management system 154 denies execution of the query. The report output by the reporting module 350 may include information describing the permission check, such as information describing why the permission check was unsuccessful.

FIGS. 4A-B illustrates an example involving use of obfuscation keys, according to one embodiment. As touched on above, a client 104 granted a compare permission can compare one column to another column so long as (1) both columns share the same obfuscation key and (2) the client has compare permissions grants for each column to be compared. Obfuscation keys are labels associated with a column; only columns that share obfuscation keys may be compared to one another. Administrators may associate columns with obfuscation keys using the DP system 102, such as via the user interface 150.

FIGS. 4A and 4B respectively illustrate a "Table A" and a "Table B," which may both be within the database 106. Each table includes two columns. Table A includes columns 610A-B and Table B includes columns 610C-D. Each column 610 is associated with a "KeySet," a set of obfuscation keys. Column 610A is associated with obfuscation keys "ABC" and "DEF," column 610B is associated with obfuscation key "GHI" while column 610C is associated with obfuscation key "ABC" and column 610D is associated with obfuscation key "DEF." A client 104 with column permission grants for columns 610A-D can compare columns 610A and 610C due to each column being associated with the "ABC" obfuscation key. Likewise, the client 104 can compare columns 610A and 610D because each column is associated with the "DEF" obfuscation key. However, the client 104 cannot compare, for example, column 610B and column 610C, even if the client has compare permissions grants for each, due to the columns 610B,C not sharing an obfuscation key.

Figure 5:
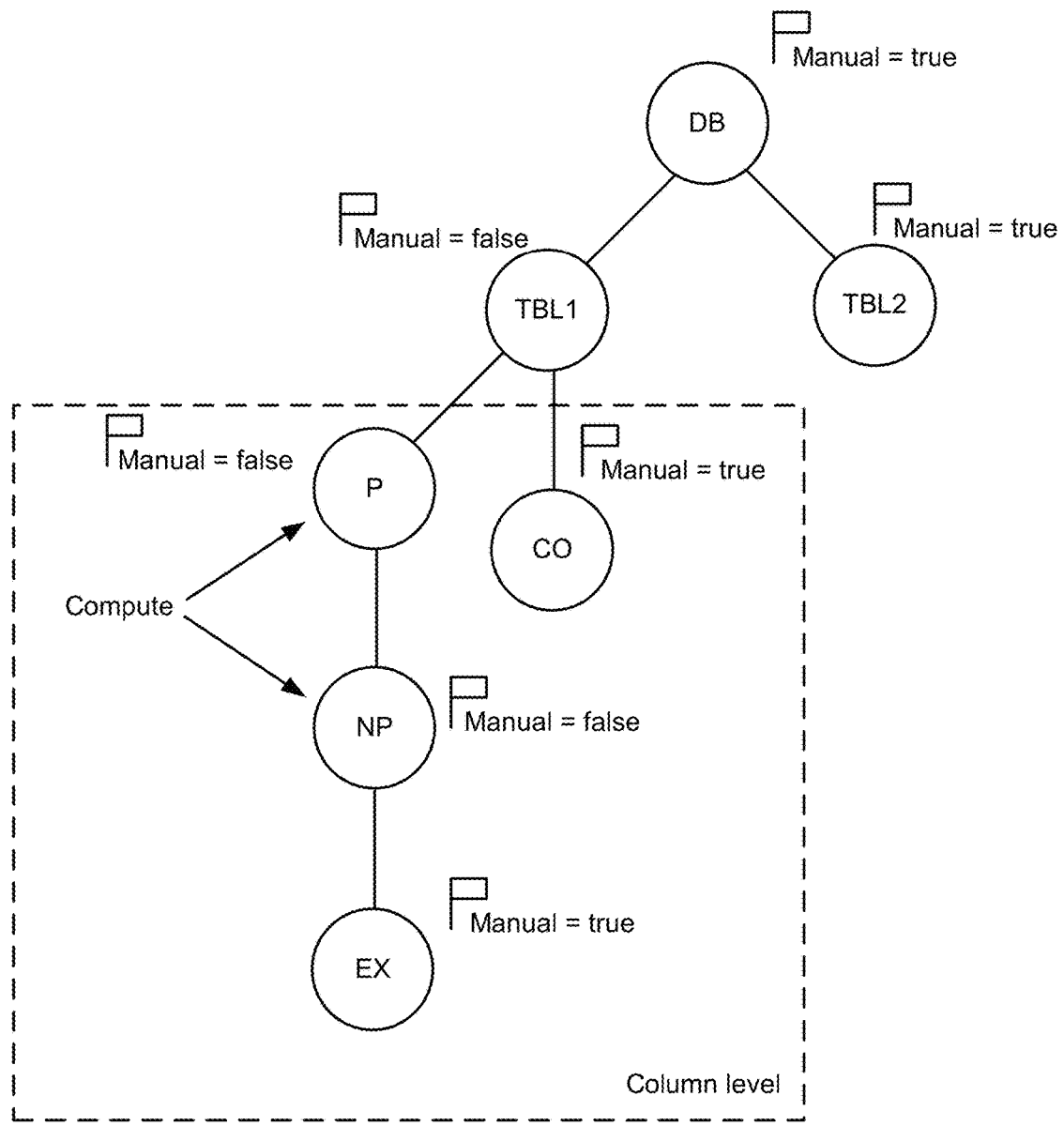
FIG. 5 illustrates a permissions hierarchy with grant flags, according to one embodiment.

FIG. 5 illustrates a permissions hierarchy with grant flags, according to one embodiment. This permissions hierarchy represents permissions that may be found in the permissions store 310. At the top of the hierarchy is a database permissions grant, labelled "DB." The database permissions grant DB has its grant flag set to true (labelled "Manual=true") and includes two tables, labelled as table permissions "TBL1" and "TBL2." TBL1 has its grant flag set to false and TBL2 has its grant flag set to true. Below TBL1 in the hierarchy is a private compute permission, labelled "P," below which is a non-private compute permission labelled "NP," and below which is an export permission labelled "EX." The private compute permission P has its manual flag set to false, the non-private compute permission NP has its manual flag set to false, and the export permission EX has its manual flag set to true. Below TBL1 in a separate hierarchical branch is a compare permission labelled "CO," with its grant flag set to false. For purposes of clarity, P, NP, EX, and CO are described herein as pertaining to one column of TBL1.

As mentioned above, a grant flag is set to true when the grant is explicitly granted. As such, in FIG. 5, DB, TBL2, CO, and EX have been explicitly granted to the user. NP, P, and TBL1 are implicitly granted due to their dependencies upon the explicitly granted permissions. For example, if EX were not explicitly granted, the user would only have permissions for DB, TBL1, TBL2, and CO. However, upon granting EX to the user, the grant flag for EX is set to true and NP and P are implicitly granted.

If EX is revoked, NP and P are revoked as well, due to only being explicitly granted by EX. However, the user will still have an implicit grant to TBL1 due to its dependency upon CO, which is an explicitly granted permission. TBL2 is not affected by the revocation of EX, as it exists in a different branch of the hierarchy. DB is not affected by the revocation of EX, as it is not only explicitly granted, but also implicitly granted by CO and TBL2.

Processes

Figure 6:
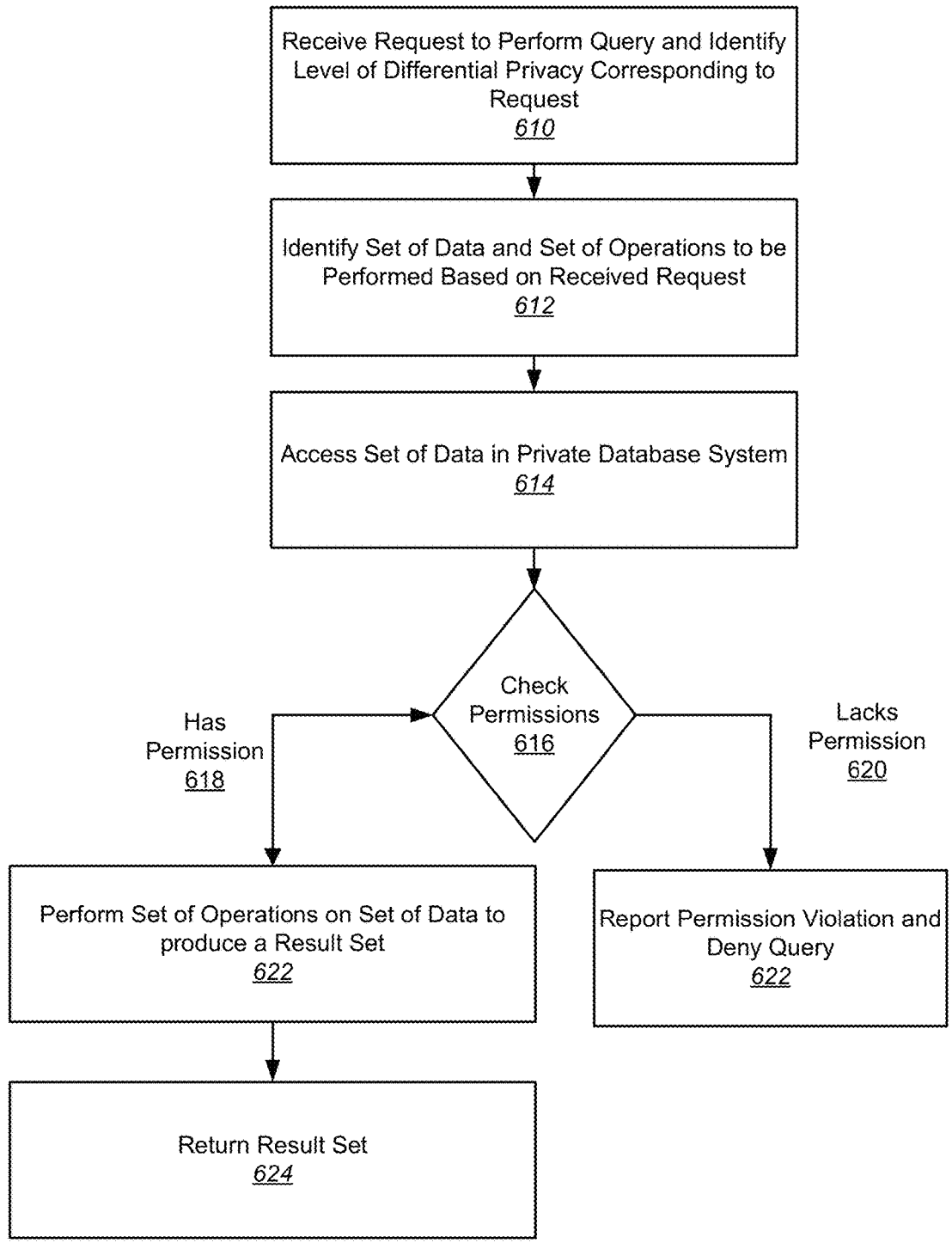
FIG. 6 illustrates a method for performing queries within a differentially private database system including a permissions system, according to one embodiment.

FIG. 6 illustrates a method for performing queries within a differentially private database system including a permissions system, according to one embodiment. Different embodiments can perform additional and/or different steps. Furthermore, other embodiments can perform the steps in different orders.

The DP system 102 receives 610 a request from a client 104 to perform a query and identifies a level of differential privacy corresponding to the request, such as a level of differential privacy included in the request. A set of data in the private database 106 and a set of operations to be performed based on the received request are identified 612 by the DP system 102. The DP system 102 accesses 614 the identified set of data.

The DP system 102 checks 616 permissions for the query. This check 616 involves identifying the permission grants of the requesting client 104, and analyzing the query in view of the permission grants to determine whether the requesting client has the permission grants required to access the data referenced by the query. The DP system 102 selectively executes the query based on the result of the check. If the permissions check 616 is successful, indicating that the client 104 has 618 the necessary permissions, the DP system 102 performs 622 the set of operations on the set of data to produce a result set. The DP system 102 then returns 624 the result set to the client 104. The result set may be differentially private, depending upon the set of operations specified in the query. If the check 616 determines that the client 104 lacks 620 the necessary permissions for the query, then the DP system 102 reports 622 the permission violation to the client 104 and denies (blocks) the query.

Figure 7:
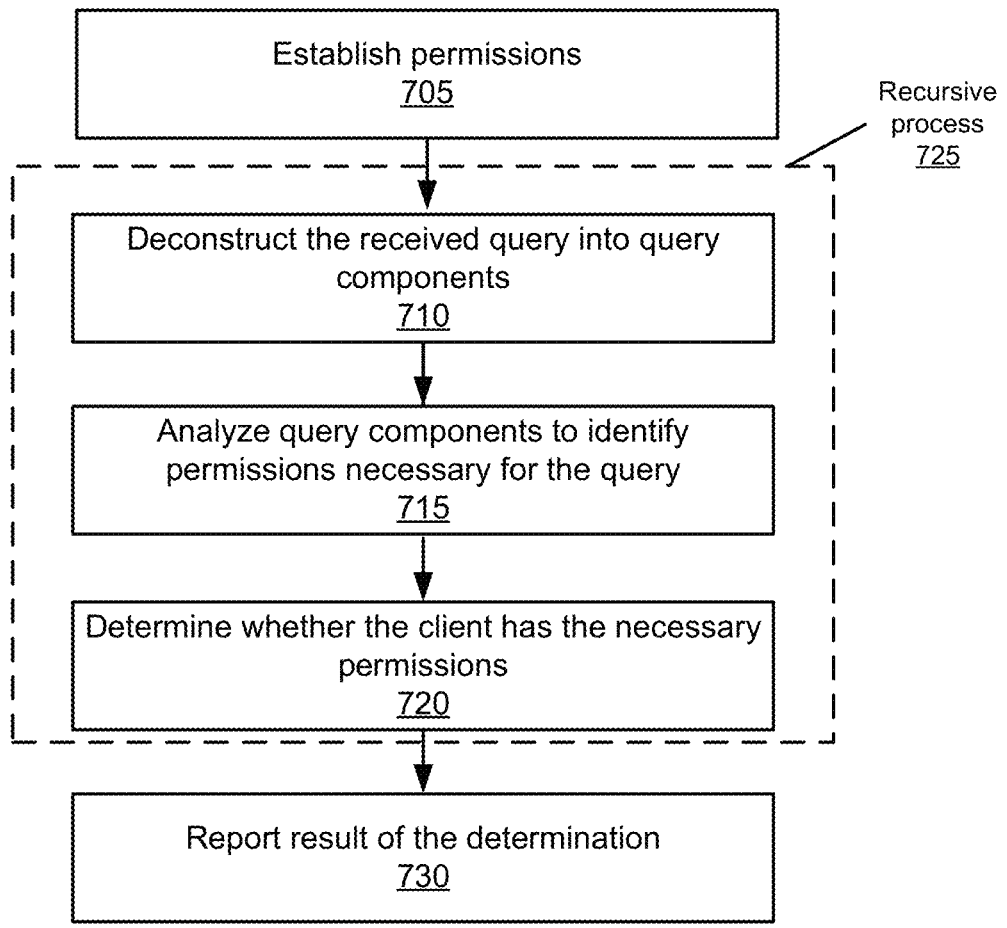
FIG. 7 illustrates a method for checking permissions in a differentially private database system, according to one embodiment.

FIG. 7 illustrates a method for checking permissions in a differentially private database system, according to one embodiment. In an embodiment, the method of FIG. 7 is performed in the check 616 of the method illustrated in FIG. 6. The method of FIG. 7 can involve different and/or additional steps in different embodiments. Furthermore, other embodiments can perform the steps in different orders.

The DP system 102 establishes 705 the client's permissions. For example, upon receiving a query from the client 104, the DP system 102 retrieves a set of permissions granted to the client from the permissions store 310. These permissions may have been assigned to the client 104 by an administrator of the DP system 102. The DP system 102 deconstructs 710 the received query into query components. The DP system 102 identifies 715 one or more relations and expressions based on the query components. The DP system 102 analyzes 715 the query components to identify the permissions necessary to execute the query. This analysis 715 involves determining the permissions necessary to perform the specified expressions on the specified relations. Further, the DP system 102 determines 720 whether the client 104 has the permissions necessary to execute the query. The process of deconstructing the query, analyzing the query components, and determining whether the client has the permissions is performed recursively 725 in one embodiment. Specifically, the DP system 102 performs an initial deconstruction of the query into its components and then uses a set of mutually recursive functions that collectively further deconstruct the components and test whether the client 104 has the permissions necessary to perform the expressions on the relations indicated by the deconstructed components. The DP system 102 reports 730 the result of the determination 725, e.g. whether the client 104 has permission to execute the query.

Computing Environment

Figure 8:
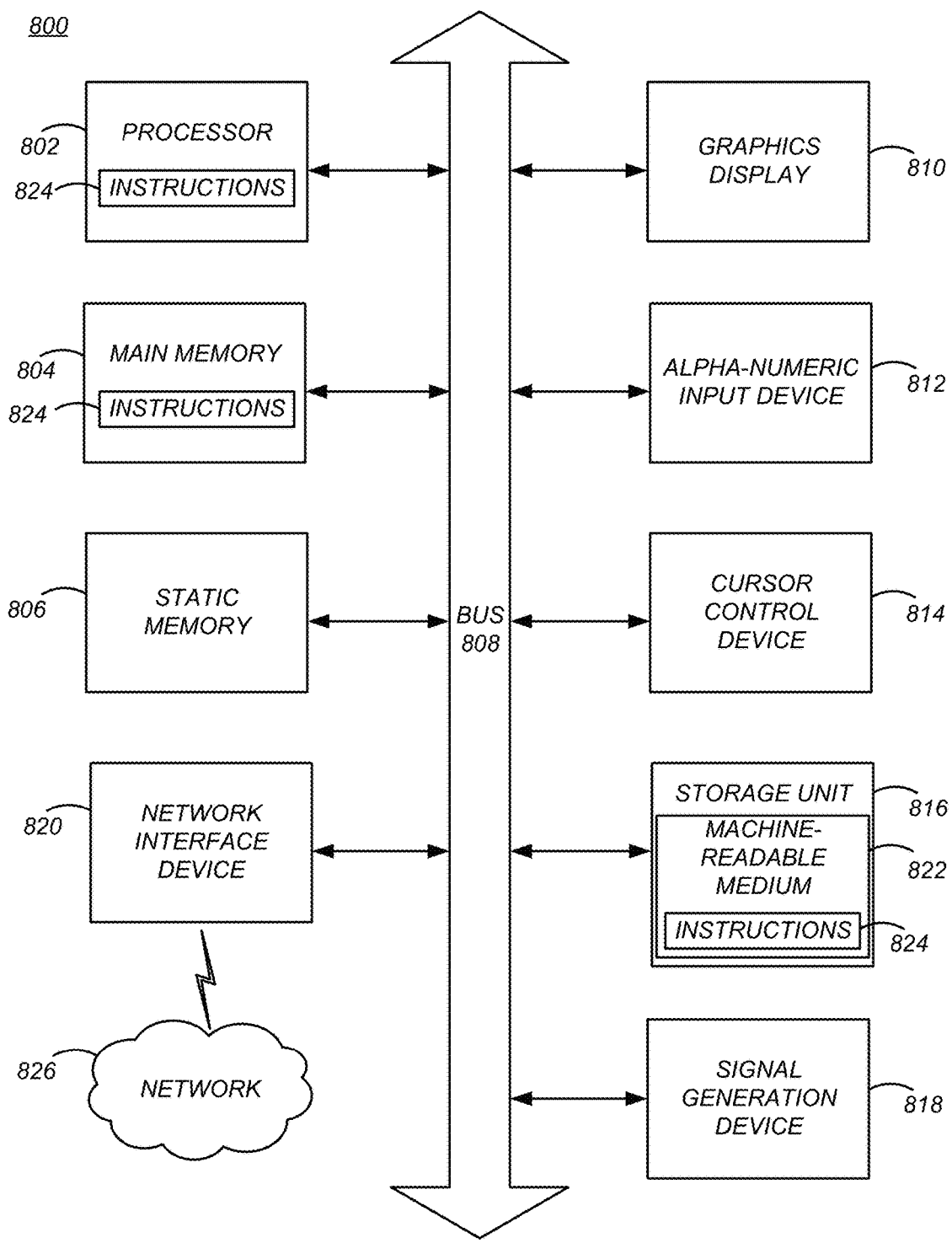
FIG. 8 is a block diagram illustrating components of an example machine able to read instructions from a machine readable medium and execute them in a processor or controller, according to one embodiment.

FIG. 8 is a block diagram illustrating components of an example machine able to read instructions from a machine readable medium and execute them in a processor or controller, according to one embodiment. Specifically, FIG. 8 shows a diagrammatic representation of a machine in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804 and the storage unit 816 communicate via a bus 808.

In addition, the computer system 806 can include a static memory 806, a display driver 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

The invention claimed is:

1. A method of providing differentially private database security, comprising:
    receiving a request from a client to perform a query on data stored in a database;
    establishing a set of permissions granted to the client with respect to the data in the database, wherein the set of permissions comprises a private compute permission granting permission to perform differentially private operations on specified data in the database;
    deconstructing the query into query components, wherein the query components comprise at least one relation identifying a dataset in the database and at least one expression specifying an operation to be performed in the identified dataset;
    identifying permissions necessary to perform the specified operation on the identified dataset, wherein the identified permissions comprise the private compute permission and the identified dataset comprises the specified data;
    determining whether the established set of permissions granted to the client includes the identified permissions necessary to perform the specified operation on the identified dataset using a set of mutually recursive functions to check whether the established set of permissions granted to the client includes the identified permissions necessary to perform expressions on relations indicated by the deconstructed query components; and
    selectively executing the query responsive to the determination.

2. The method of claim 1, wherein establishing the set of permissions of the client with respect to the database comprises:
    accessing a data store storing data describing a discrete set of permissions granted to the client, the discrete set of permissions including explicit permissions granted to the client and implicit permissions granted to the client responsive to the explicit permissions, the data store further storing data indicating whether each permission in the discrete set of permissions is explicitly or implicitly granted to the client;
    wherein determining whether the established set of permissions grants of the client include the identified permissions necessary to perform the specified operation comprises determining whether the discrete set of permissions includes the identified permissions.

3. The method of claim 2, further comprising:
receiving an instruction explicitly granting a permission to the client;
determining a set of implicit permissions implicitly granted to the client responsive to the explicitly-granted permission; and
modifying data in the data store to indicate that the explicitly-granted permission is explicitly granted to the client and the set of implicit permission are implicitly granted to the client.

4. The method of claim 2, further comprising:
receiving an instruction revoking an explicitly granted permission from the client;
revoking a set of implicit permissions implicitly granted to the client responsive to the explicitly-granted permission; and
modifying data in the data store to indicate revocation of the explicitly-granted permission and revocation of the set of implicit permissions.

5. The method of claim 1, wherein selectively executing the query responsive to the determination comprises:
blocking the query responsive to determining that the established set of permissions does not grant the client the identified permissions necessary to perform the specified operation on the specified query; and
allowing the query responsive to determining that the established set of permissions does grant the client the identified permissions necessary to perform the specified operation on the specified query.

6. The method of claim 1, wherein the relation identifies a pair of columns in the database and the expression specifies a compare operation comparing a value in a first column of the pair to a value in a second column of the pair, and wherein determining whether the established set of permissions grants of the client include the identified permissions necessary to perform the specified operation on the identified dataset comprises:
identifying a first set of obfuscation keys associated with the first column and a second set of obfuscation keys associated with a second column of the pair;
determining whether the first set of obfuscation keys and the second set of obfuscation keys have an obfuscation key in common; and
determining that the established set of permissions grants of the client are the identified permissions necessary to perform the specified operation responsive to determining that the first set of obfuscation keys and the second set of obfuscation keys have an obfuscation key in common.

7. The method of claim 1, wherein the determining comprises determining that the established set of permissions granted to the client includes the identified permissions necessary to perform the specified operation on the identified dataset and the selectively executing comprises executing a differentially private operation upon the specified data.

8. A non-transitory computer-readable storage medium storing computer program instructions executable by a processor to perform operations, the operations comprising:
receiving a request from a client to perform a query on data stored in a database;
establishing a set of permissions granted to the client with respect to the data in the database, wherein the set of permissions comprises a private compute permission granting permission to perform differentially private operations on specified data in the database;
deconstructing the query into query components, wherein the query components comprise at least one relation identifying a dataset in the database and at least one expression specifying an operation to be performed in the identified dataset;
identifying permissions necessary to perform the specified operation on the identified dataset, wherein the identified permissions comprise the private compute permission and the identified dataset comprises the specified data;
determining whether the established set of permissions granted to the client includes the identified permissions necessary to perform the specified operation on the identified dataset using a set of mutually recursive functions to check whether the established set of permissions granted to the client includes the identified permissions necessary to perform expressions on relations indicated by the deconstructed query components; and
selectively executing the query responsive to the determination.

9. The non-transitory computer-readable storage medium of claim 8, wherein establishing the set of permissions of the client with respect to the database comprises:
accessing a data store storing data describing a discrete set of permissions granted to the client, the discrete set of permissions including explicit permissions granted to the client and implicit permissions granted to the client responsive to the explicit permissions, the data store further storing data indicating whether each permission in the discrete set of permissions is explicitly or implicitly granted to the client;
wherein determining whether the established set of permissions grants of the client include the identified permissions necessary to perform the specified operation comprises determining whether the discrete set of permissions includes the identified permissions.

10. The non-transitory computer-readable storage medium of claim 9, the operations further comprising:
receiving an instruction explicitly granting a permission to the client;
determining a set of implicit permissions implicitly granted to the client responsive to the explicitly-granted permission; and
modifying data in the data store to indicate that the explicitly-granted permission is explicitly granted to the client and the set of implicit permission are implicitly granted to the client.

11. The non-transitory computer-readable storage medium of claim 9, the operations further comprising:
receiving an instruction revoking an explicitly granted permission from the client;
revoking a set of implicit permissions implicitly granted to the client responsive to the explicitly-granted permission; and
modifying data in the data store to indicate revocation of the explicitly-granted permission and revocation of the set of implicit permissions.

12. The non-transitory computer-readable storage medium of claim 8, wherein selectively executing the query responsive to the determination comprises:
blocking the query responsive to determining that the established set of permissions does not grant the client the identified permissions necessary to perform the specified operation on the specified query; and
allowing the query responsive to determining that the established set of permissions does grant the client the identified permissions necessary to perform the specified operation on the specified query.

13. The non-transitory computer-readable storage medium of claim 8, wherein the relation identifies a pair of columns in the database and the expression specifies a compare operation comparing a value in a first column of the pair to a value in a second column of the pair, and wherein determining whether the established set of permissions grants of the client include the identified permissions necessary to perform the specified operation on the identified dataset comprises:
- identifying a first set of obfuscation keys associated with the first column and a second set of obfuscation keys associated with a second column of the pair;
- determining whether the first set of obfuscation keys and the second set of obfuscation keys have an obfuscation key in common; and
- determining that the established set of permissions grants of the client are the identified permissions necessary to perform the specified operation responsive to determining that the first set of obfuscation keys and the second set of obfuscation keys have an obfuscation key in common.

14. A system, comprising:
- a processor for executing computer program instructions; and
- a non-transitory computer-readable storage medium storing computer program instructions executable by the processor to perform operations, the operations comprising:
  - receiving a request from a client to perform a query on data stored in a database;
  - establishing a set of permissions granted to the client with respect to the data in the database, wherein the set of permissions comprises a private compute permission granting permission to perform differentially private operations on specified data in the database;
  - deconstructing the query into query components, wherein the query components comprise at least one relation identifying a dataset in the database and at least one expression specifying an operation to be performed in the identified dataset;
  - identifying permissions necessary to perform the specified operation on the identified dataset, wherein the identified permissions comprise the private compute permission and the identified dataset comprises the specified data;
  - determining whether the established set of permissions granted to the client include the identified permissions necessary to perform the specified operation on the identified dataset using a set of mutually recursive functions to check whether the established set of permissions granted to the client includes the identified permissions necessary to perform expressions on relations indicated by the deconstructed query components; and
  - selectively executing the query responsive to the determination.

15. The system of claim 14, wherein establishing the set of permissions of the client with respect to the database comprises:
- accessing a data store storing data describing a discrete set of permissions granted to the client, the discrete set of permissions including explicit permissions granted to the client and implicit permissions granted to the client responsive to the explicit permissions, the data store further storing data indicating whether each permission in the discrete set of permissions is explicitly or implicitly granted to the client;
- wherein determining whether the established set of permissions grants of the client include the identified permissions necessary to perform the specified operation comprises determining whether the discrete set of permissions includes the identified permissions.

16. The system of claim 15, the operations further comprising:
- receiving an instruction explicitly granting a permission to the client;
- determining a set of implicit permissions implicitly granted to the client responsive to the explicitly-granted permission; and
- modifying data in the data store to indicate that the explicitly-granted permission is explicitly granted to the client and the set of implicit permission are implicitly granted to the client.

17. The system of claim 15, the operations further comprising:
- receiving an instruction revoking an explicitly granted permission from the client;
- revoking a set of implicit permissions implicitly granted to the client responsive to the explicitly-granted permission; and
- modifying data in the data store to indicate revocation of the explicitly-granted permission and revocation of the set of implicit permissions.

18. The system of claim 14, wherein selectively executing the query responsive to the determination comprises:
- blocking the query responsive to determining that the established set of permissions does not grant the client the identified permissions necessary to perform the specified operation on the specified query; and
- allowing the query responsive to determining that the established set of permissions does grant the client the identified permissions necessary to perform the specified operation on the specified query.

* * * * *